(12) United States Patent
Handa

(10) Patent No.: US 7,757,726 B2
(45) Date of Patent: Jul. 20, 2010

(54) SYSTEM FOR ENHANCING THE EFFICIENCY OF HIGH PRESSURE STORAGE TANKS FOR COMPRESSED NATURAL GAS OR HYDROGEN

(76) Inventor: Kiyoshi Handa, Honda R&D Americas, Inc., 21001 State Route 739, Raymond, OH (US) 43067-9705

( * ) Notice: Subject to any disclaimer, the term of this patent is extended or adjusted under 35 U.S.C. 154(b) by 999 days.

(21) Appl. No.: 11/380,996

(22) Filed: May 1, 2006

(65) Prior Publication Data

US 2007/0000562 A1    Jan. 4, 2007

Related U.S. Application Data

(60) Provisional application No. 60/678,253, filed on May 6, 2005.

(51) Int. Cl.
*B65B 1/20* (2006.01)
(52) U.S. Cl. .............................. 141/82; 141/18; 62/501; 42/61
(58) Field of Classification Search ...................... 141/2, 141/4, 11, 18, 69, 82, 98, 285, 286; 62/50.1–50.5, 62/45.1, 238.1; 123/525; 165/42, 60, 61; 206/0.6; 220/581; 429/26
See application file for complete search history.

(56) References Cited

U.S. PATENT DOCUMENTS

| 5,092,281 | A   | * | 3/1992  | Iwaki et al. ..................... 123/3 |
| 5,357,758 | A   | * | 10/1994 | Andonian .................... 62/45.1 |
| 6,698,469 | B2  | * | 3/2004  | Sakamoto et al. ............. 141/91 |
| 6,755,225 | B1  | * | 6/2004  | Niedwiecki et al. ......... 141/231 |
| 2004/0247959 | A1 | * | 12/2004 | Kimbara et al. ............... 429/20 |
| 2005/0287407 | A1 | * | 12/2005 | Bushko ........................ 429/26 |

* cited by examiner

*Primary Examiner*—Gregory L Huson
*Assistant Examiner*—Jason K Niesz
(74) *Attorney, Agent, or Firm*—Mark E. Duell; Porter Wright Morris & Arthur, LLP

(57) ABSTRACT

A system for reducing the energy and for reducing the time required to refill on board tanks on a vehicle from a high pressure fuel depot refilling line operatively interconnected to the tank wherein the refuel gas itself is circulated within the on board tank to absorb the compression heat of refueling, and the heat thereby absorbed is radiated from the refueling circuit to an external environment such that a close to optimum refill of the tank is achieved without the need for a slow fill, precooling or pressure overfill.

10 Claims, 12 Drawing Sheets

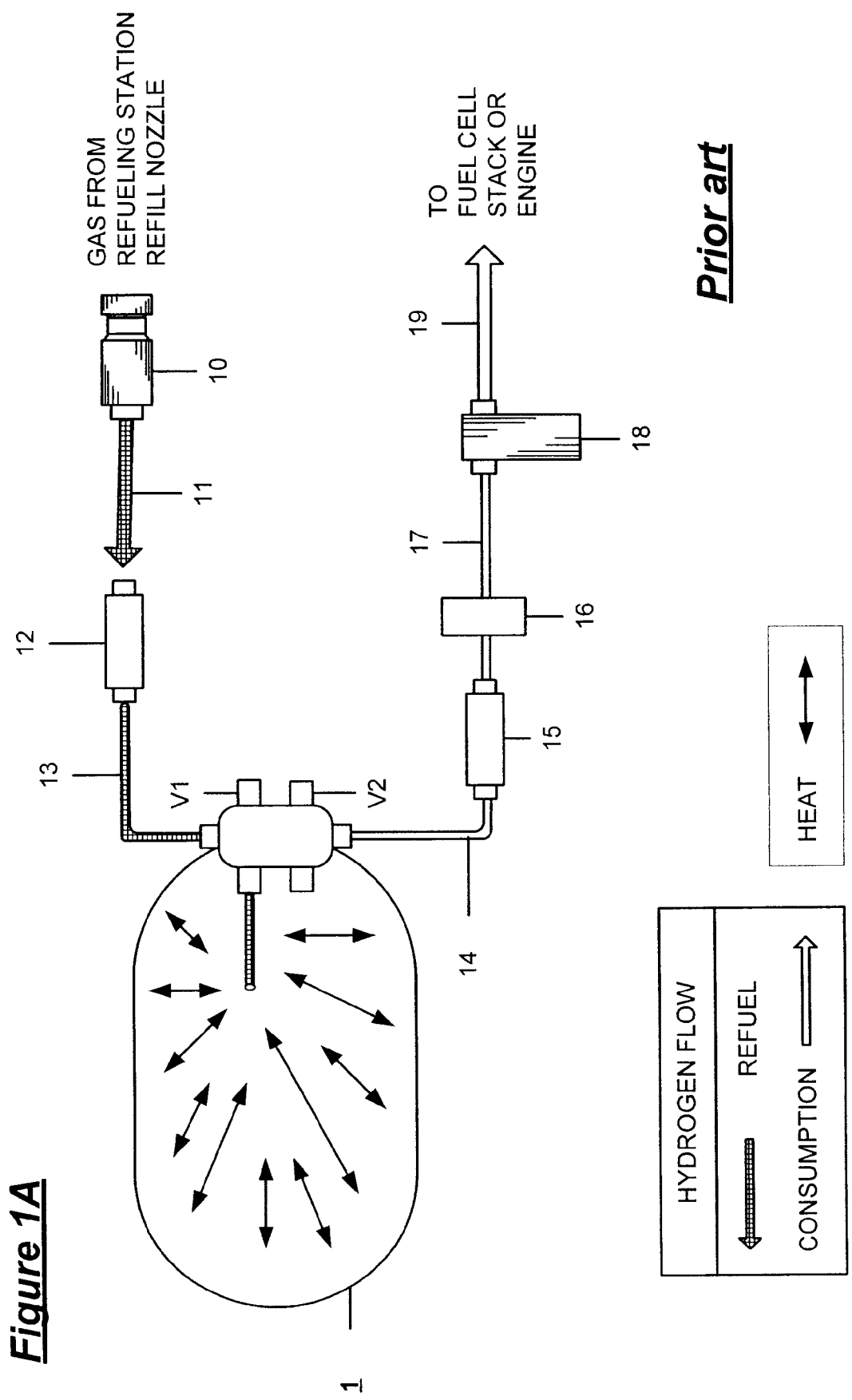
*Figure 1A*  *Prior art*

US 7,757,726 B2

SYSTEM FOR ENHANCING THE EFFICIENCY OF HIGH PRESSURE STORAGE TANKS FOR COMPRESSED NATURAL GAS OR HYDROGEN

RELATED APPLICATIONS

This application is related to and claims all benefits under 35 U.S.C. §119(e) of my earlier U.S. Provisional Patent Application Ser. No. 60/678,253 filed on May 6, 2005, entitled "System For Enhancing the Refueling Efficiency of High Pressure Storage Tanks for Compressed Natural Gas or Hydrogen."

FIELD OF THE INVENTION

The present invention relates to an apparatus and system for enhancing the refueling efficiency of high pressure storage tanks for compressed natural gas or hydrogen, and particularly for efficiently refueling vehicle on board gas tanks for hydrogen and compressed natural gas to a design optimum capacity from high pressure storage tanks used at refueling stations.

BACKGROUND OF THE INVENTION

When hydrogen is used as a fuel in motor vehicles, a hydrogen fuel depot infrastructure for refueling must also be developed. Typically, in the use of hydrogen to fuel motor vehicles powered by fuel cells, or in the use of compressed natural gas (CNG) to power internal combustion engines in motor vehicles, present practice is that hydrogen is stored in refillable on board fuel tanks having a maximum design pressure in the range of about 5000 psi, CNG is stored in tanks having a maximum design pressure in the range of about 3600 psi. Pressures exceeding 3600 psi and 5000 psi and in the range of about 10,000 psi or more are likely to be utilized as the use of high pressure gas technology becomes more widespread. An increase in the energy efficiency of the overall system of fuel depots, vehicle tanks, refueling systems, and their interrelationships is a desirable goal.

Hydrogen powered vehicles utilize light weight polymer/composite hydrogen storage tanks to store hydrogen fuel on board at high pressure. Herein, reference to hydrogen powered vehicles correlates with the use of the invention with compressed natural gas powered vehicles (CNGVs). For clarity and convenience, hydrogen is referred to in the specification and is a term intended to be interchangeable, generally evident in context, with compressed natural gas, high pressure gas, or gas. The use of multiple cylindrically shaped small tanks rather than one large tank is preferred for vehicle design purposes. Various designs for high pressure hydrogen refueling systems have been proposed. When a hydrogen powered vehicle is filled with hydrogen, the pressurized on board storage tanks may be characterized as including chemical energy from the hydrogen itself (consumed in powering the vehicle), and mechanical and thermal energy associated with the high pressure under which the hydrogen gas enters the tank at the refuel depot and the high pressure under which the gas is refueled and stored the vehicle tank[s].

During a high pressure refueling process with hydrogen or CNG, the interior of the on board tanks, namely, the gas itself, becomes heated as a result of gas compression as the tank pressure increases and other refueling parameters affect the process. [After refueling, the tank interior gas temperature and pressure decrease slowly as the fuel gas is consumed during vehicle operation.] Conventionally, it is not usually possible to obtain a full refill tank pressure to a high pressure design maximum without pressure compensation during the course of refueling, namely, the charge of fuel input into and stored in the tank must be initially in excess of the optimum design tank pressure because of the compression/heating effect caused by the high pressure compression of gas in the tank as a result of refueling. As a result, vehicle mileage in terms of vehicle range is reduced; the use of higher design pressures worsens this condition. Solutions have been proposed to resolve this under fill problem. A slower flow rate during refill results in a lower initial tank temperature, however, a slow fill, is undesirable, and may be impractical when significant numbers of users are involved. An undesirable consequence of a slower flow rate during refueling to avoid heat build up is a longer refueling time. Another option is to cool the gas before refueling; however, pre-cooling requires substantial energy, thereby reducing the overall energy efficiency of a hydrogen economy. A pressure overfill as another option requires an additional energy expense in gas compression, exacerbating the heat generated in the tank as a result of high pressure compression. In any case, secondary treatment of the gas is generally unnecessary when fill pressures are at 5000 psi or lower. As tank pressures exceed 3600 psi and 5000 psi and approach or exceed 10,000 psi, cooling becomes an important factor in the refueling process to achieve a full tank capacity fill. When a full fill is achieved, overall vehicle range per each tank refill thereby increases, energy required for a refill (such as for precooling or a pressure overfill) is reduced, and overall customer satisfaction increases.

OBJECTS OF THE INVENTION

It is an object of the present invention to minimize energy use and increase refueling efficiency in high pressure gas refilling systems when factored into the overall energy efficiency of an infrastructure of hydrogen powered vehicles and fuel depots. Typically, each time a vehicle is refueled with high pressure gas, compression energy results in tank (namely, the gas inside the tank) heating, hence, it is an object of the invention to minimize high pressure gas and tank heating and to increase the efficiency and refueling capacity of an on board fuel storage tank in gas powered motor vehicles. It is an object of the invention to provide a system that can remove the compression heat resulting from refueling an on board tank during high pressure refueling. A faster refueling time, increased refueling efficiency and an overall vehicle range increase will result because of improved tank capacity per unit volume during refilling, particularly where nominal refill pressure is in the range of 10,000 psi or greater.

SUMMARY OF THE INVENTION

In accordance with the present invention, reduction of fuel tank heating during the refueling process, is effected by a heat evacuation system in which an interior tank heat absorber is interconnected with an external heat radiator; the interior absorber collects tank heat resulting from high pressure gas compression and radiates the absorbed heat into the ambient atmosphere or other vehicle system appropriate for the dispersion of collected heat. The high pressure refueling gas from the refill depot itself is circulated in a tube circuit within the tank interior to an external radiator where absorbed heat associated with gas compression during the refueling process is radiated to or absorbed by the external environment before the refueling gas enters the tank. In this manner; the intrinsic energy from the high flow rate of the refill gas having a pressure exceeding 3600 psi or 5000 psi to the range of 10,000 psi or greater, is utilized to power the heat evacuation system. The invention allows the use of a composite plastic tank resulting in a reduction in vehicle weight. Reduction of fuel tank heating during the refueling process is provided by a heat evacuation system in which a tank interior heat absorber is interconnects with an external heat radiator, collecting interior tank heat and radiating the absorbed heat into the ambient atmosphere before the high pressure refuel gas enters the tank. Time and energy consuming techniques such as a slow fill, secondary precooling and pressure overfill are not necessary. In brief, the invention provides a system for reducing the energy and for reducing the time required to refill on board tanks on a vehicle from a high pressure fuel depot refilling line operatively interconnected to the tank wherein the refuel gas itself is circulated within the on board tank to absorb the compression heat of refueling, and the heat thereby absorbed is radiated from the refueling circuit to an external environment before the fuel reaches the tank such that a close to optimum refill of the tank is achieved.

The invention is described more fully in the following description of the preferred embodiment considered in view of the drawings in which:

The interpretation of the legends included in FIG. 1A, FIG. 1B, FIG. 2, FIG. 3A, FIG. 9A, FIG. 9B and FIG. 9C as incorporated in other figures is self evident.

DETAILED DESCRIPTION OF THE INVENTION

The system of the invention increases the refueling energy efficiency of hydrogen powered vehicles by withdrawing the heat of refilling compression from the high pressure gas introduced into on board tanks and by eliminating the need for a slow fill, a pressure overfill and/or refueling station precooling of the gas. Less energy is required to completely refill on board vehicle tanks at a refueling depot. The invention reduces the energy required to recharge the on board vehicle tanks with high pressure gas at the station to return the tanks to a full optimal state in the process of refueling. As a result, overall infrastructure energy requirements are reduced, vehicle mileage range is increased, reducing the need for short interval refills, and enhancing consumer satisfaction. The energy and time required to refill on board tanks on a vehicle from a high pressure fuel depot refilling line is reduced by the invention. A cooling circuit coil is disposed within the on board tank and is operatively interconnected with the refuel gas inlet wherein the refuel gas itself is circulated within the cooling circuit in the on board tank to absorb the compression heat of refueling. The compression heat of high pressure refill is thereby absorbed and radiated from the cooling/refueling circuit to an external environment such that a close to optimum refill of the tank is achieved without a slow fill, precooling or pressure overfill.

Figure 1B:
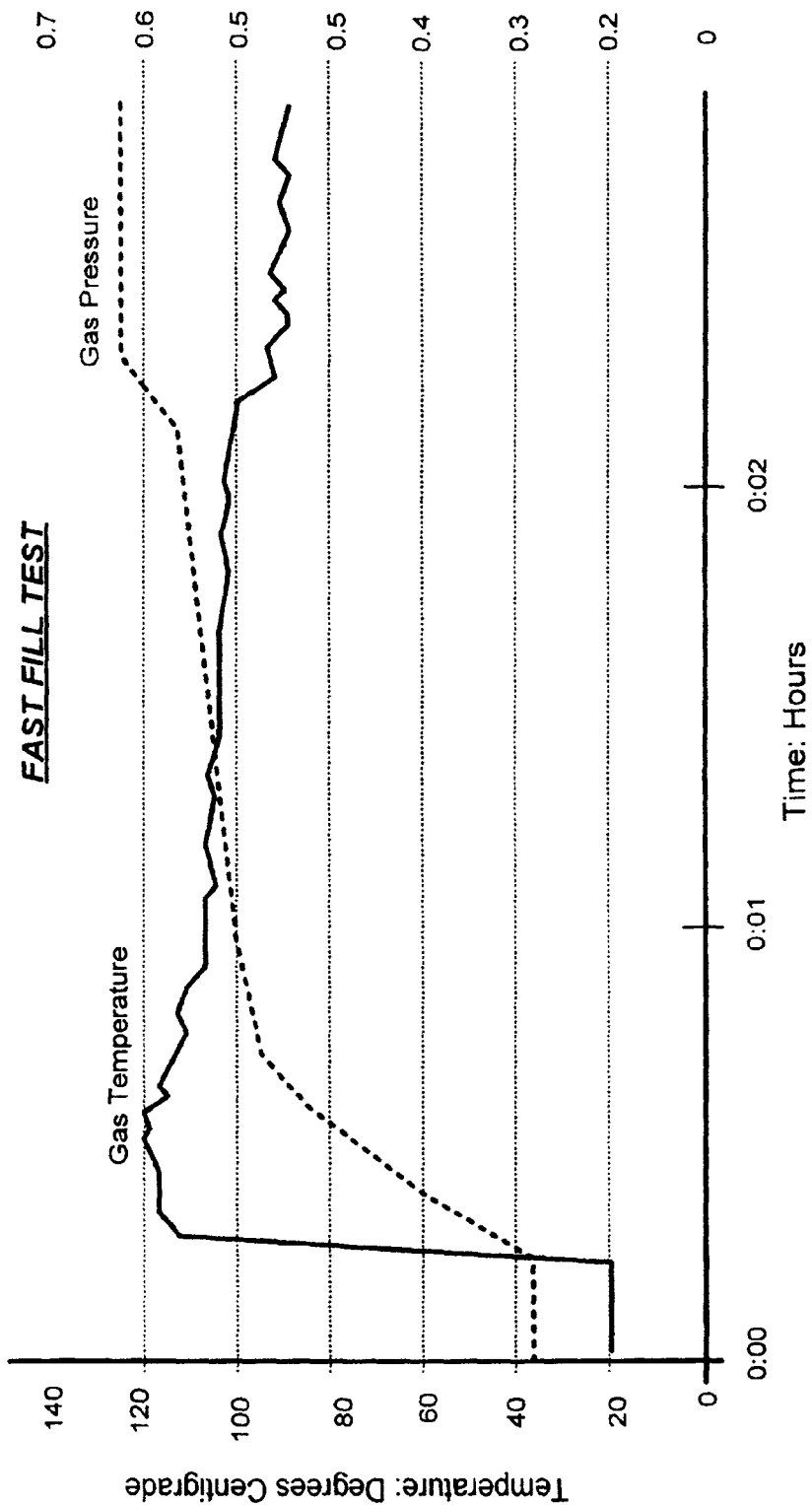
FIG. 1A is a schematic diagram showing heat radiation and build up in a vehicle fuel tank in a prior art pressurized hydrogen (or CNG) refueling system. A chart of gas temperature T C° and gas pressure P, plotted versus time, derived from a fast fill high pressure test is shown in FIG. 1B.

FIG. 1A illustrates an example of a prior art high pressure storage tank system for hydrogen or compressed natural gas motor vehicles. A first on board tank 1 includes an inlet valve V1 with a fuel line check valve 12 in series with refuel line 13 connectable to station refill nozzle 10 allowing the flow of hydrogen 11 into the tank. Fuel consumption line from the tank 14 extends from tank outlet valve V2 through control valve 15 and pressure regulators 16 and 18 to the fuel cell stack or vehicle engine through fuel lines 17 and 19. Illustrating the phenomenon with which the invention is concerned, a chart of gas temperature T C° and gas pressure P, plotted against time, as derived from a fast fill test, is shown in FIG. 1B.

Typically the on board vehicle tanks are cylindrical with hemispherical ends and are capable of storing a charge of high pressure hydrogen gas at an approximately 5000 psi design pressure (3600 psi for CNGVs). Maximum rated pressure capacities exceeding 3600 psi and 5000 psi, and in the range of up to 10,000 psi or more at a defined temperature are foreseeable as high pressure vehicle technology becomes more widespread. A typical full charge by weight of hydrogen for a standard vehicle may be approximately 15 pounds by weight. As illustrated in FIG. 1A, during refueling, high pressure gas in the tank interior is compressed, creating heat (increasing the gas temperature) as figuratively shown by the arrows →, →, etc. Tank (gas) temperature increases with higher pressure during refill. As a practical matter, in the instance of an overfill, exceeding the maximum allowable design temperature and/or pressure of an on board tank may preclude a full refill, thus resulting in reduced vehicle range when compared to the design specification. In contrast, the system of the invention evacuates the heat of refueling compression of the gas by providing the cooling systems described below that utilize the intrinsic refilling energy of the refill gas itself. The system is light in weight, has a small dead volume in the tank, and is low in cost. The invention utilizes a preexisting energy source intrinsic in the mechanical energy of the high pressure gas being refilled resulting in a considerable cooling heat flow from absorption within the tank to heat radiation external to the tank.

Figure 2:
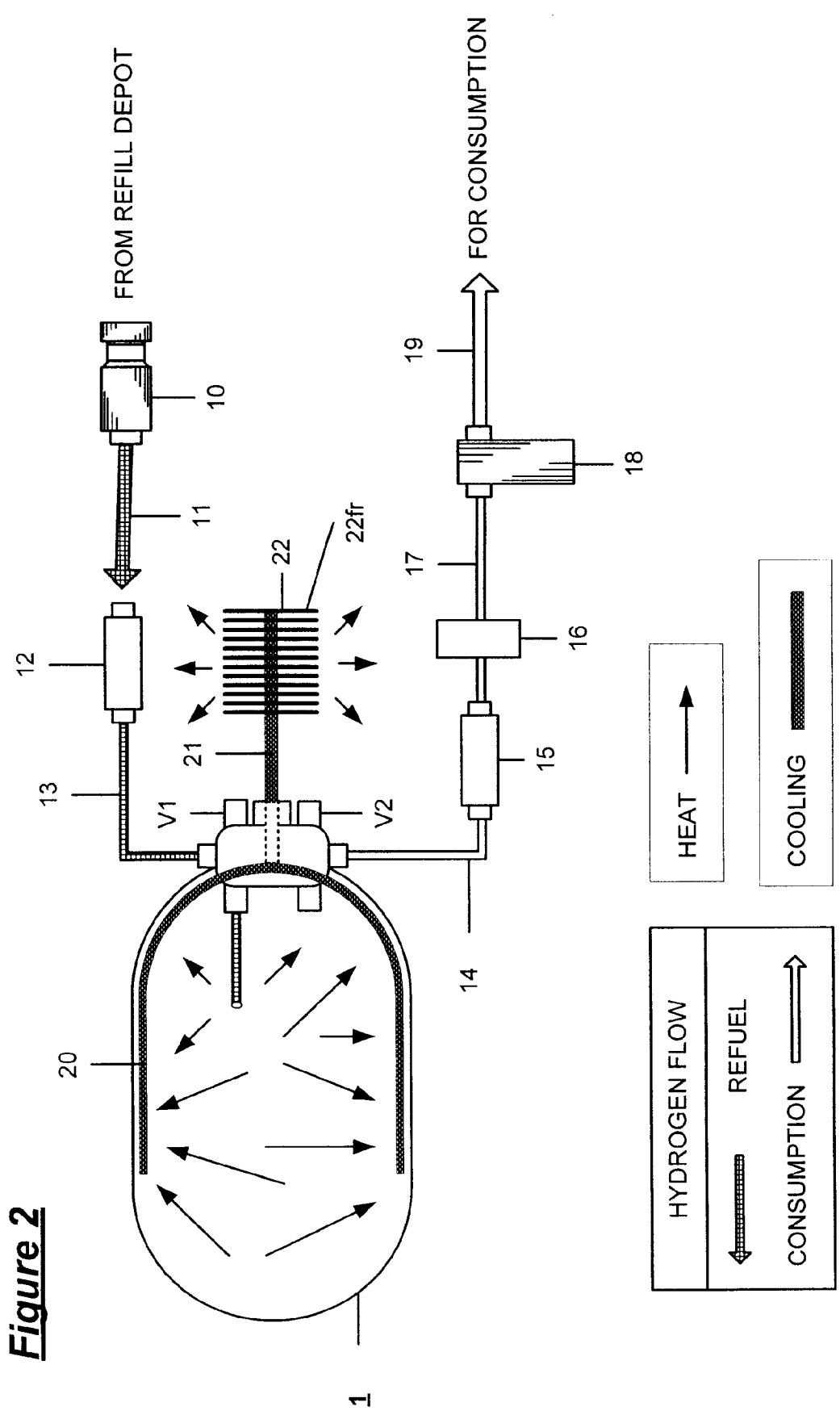
FIG. 2 shows a metal interior liner encompassing at least a portion of a tank interior utilized to absorb refueling heat of compression by heat mass absorption. The heat absorbed by the liner may be transferred by conduction to the tank exterior where the captured heat is radiated.

FIG. 2 illustrates an example of a motor vehicle high pressure storage tank system having a heat capture and dispersion system. The fuel tank is formed of a carbon fiber composite and includes an interior liner 20 formed of aluminum, copper or similar heat absorbent material, or an alloy of any, which captures the compression heat of gas refueling → which may in turn be transmitted through heat transfer pipe or conduit 21 to an external radiator 22 having a plurality of radiating fins 22$fr$, or other heat radiator mechanism. When the refill pressure is 5000 psi, pre-cooling at the fuel depot is unnecessary because the tank liner will absorb excessive heat; however, metal liner tanks are expensive and heavy and may be inadequate to handle the heat load associated with higher pressure refills.

Figure 3A:
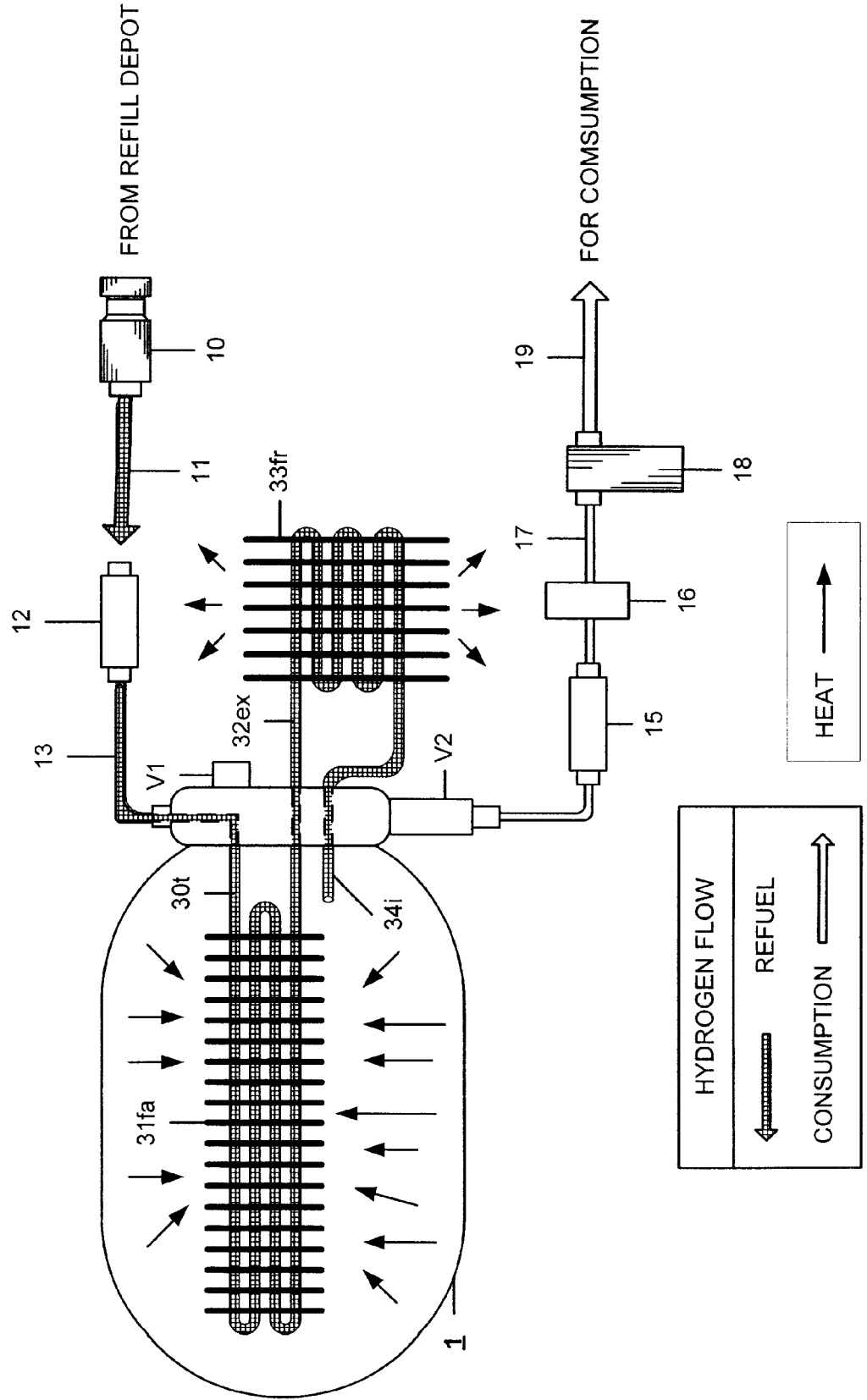
FIG. 3A shows a one tank example of a central heat absorbing circuit disposed within the interior of an on board tank where refill gas circulates through the circuit that includes an external radiator before being introduced into the tank.

FIG. 3A illustrates a vehicle high pressure storage tank system of the invention including a heat absorbent tube coil in the tank interior included in a refueling/cooling circuit to utilize the energy of refueling to absorb the refueling heat of compression and to transfer the heat to an external radiator to radiate the heat absorbed by the coil in the tank to the environment external to the tank. The high pressure gas is introduced into the interior tank coil and cooled while passing through the external radiator, and having so circulated within the circuit, is ultimately introduced at a cooled temperature into the on board tank. With a cooler temperature, more gas per unit pressure can be input into the tank. In FIG. 3A, after the refill gas passes through inlet valve V1, the heat absorption interior coil pipe 30$t$ circulates the refueling gas within the tank interior in the coil in one or more circuits. As shown in the example, the coil includes a plurality of heat absorbent fins 31$fa$ and the circulating refill gas (with heat absorbed) exits the tank through exterior cooling conduit or pipe 32$ex$ wherein the circulating gas is directed to an external heat sink or radiator such as the finned device shown as 33$fr$, a mesh radiator, a water chamber, an air cooling fan, the vehicle frame or body or any other like mechanism capable of releasing or dispersing the absorbed heat. After cooling the gas is introduced into the tank through inlet stem 34$i$.

Figure 3B:
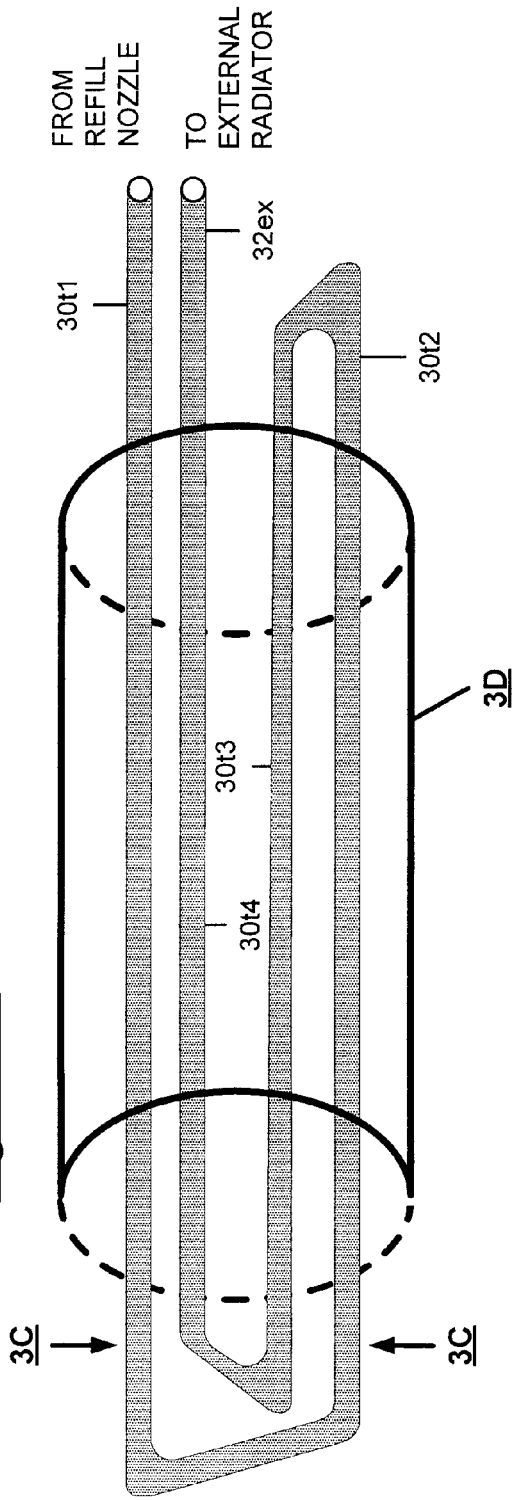
FIG. 3B is a schematic drawing of the refill tubing coil circuit, within the tank, within which the refueling gas circulates, as disposed within the tank.
Figure 3D:
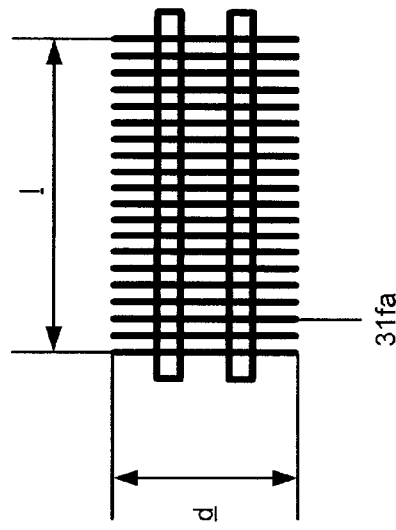
FIG. 3D is a side plan view of the cylinder section 3D designated in FIG. 3B. The cylinder shape defines a volume for calculating total internal heat absorption capacity for a series of circular fins such as shown in FIG. 3D utilized for the absorption of heat from the circulating gas.
Figure 3C:
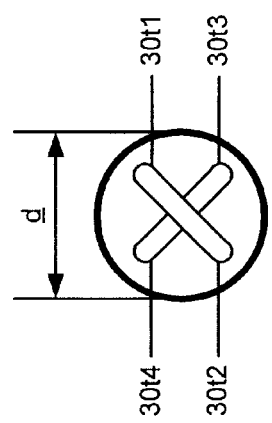
FIG. 3C is a cross section of the end section and cylinder shown in FIG. 3B demarking the end configuration of the coiled tubing circuit.

FIGS. 3B, 3C and 3D illustrate an internal tank cooling heat absorber comprising a circulating coil for the refuel gas such as shown in FIG. 3A. A concentrically surrounding plurality of heat absorbent fins (not shown individually) is disposed in a series within the interior volume of the tank; the finned volume is defined by the cylinder identified as 3D. From the refill inlet, the refuel gas tube cooling circuit follows tube sections 30$t$1, 30$t$2, 30$t$3, and 30$t$4, exiting the tank interior to external outlet 32$ex$ for connection to a radiator. The internal fin assembly 3C has the diameter d shown in FIG. 3C and FIG. 3C and the length l shown in FIG. 3D. With a given number of fins in the cylindrical assembly, e.g., 31$fa$, 31$f$..., and each fin having a known diameter, thickness, mass, and coefficient of heat absorption, heat radiation, and other factors affecting the assembly, the cooling (and radiation) capacity of the fin assembly can be calculated.

Figure 3E:
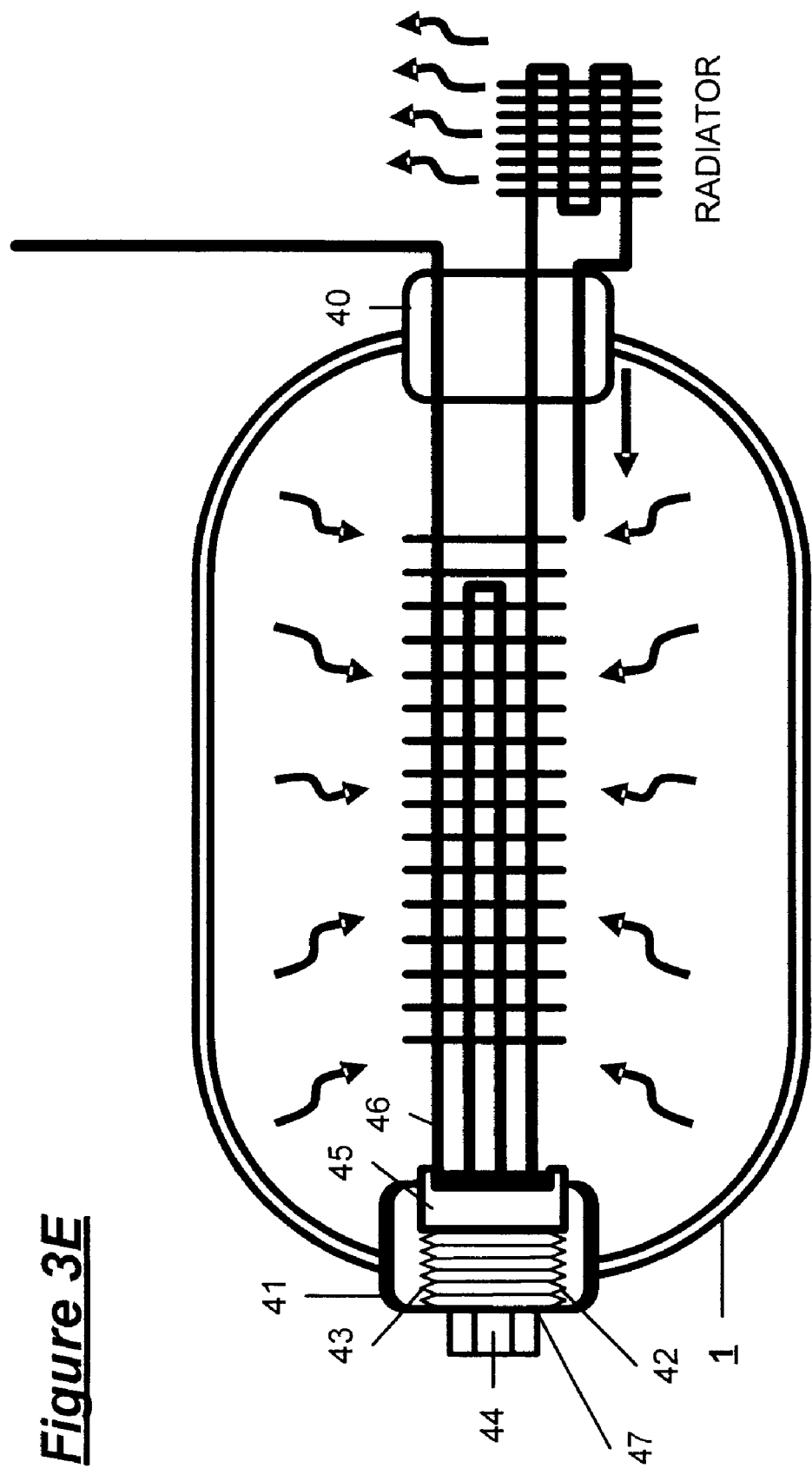
FIG. 3E shows an example of an end cap configuration for the tank used to secure the cooling circuit refill gas tube circulation system within the tank.

FIG. 3E shows a configuration for a tank 1 of the invention wherein either side of the tank end includes a cap such as 40 and 41. Cap 41 at the end of the tank opposite the inlet and outlet valve side end 40 includes inside threads 42 cooperative with exterior threads 43 and locking nut 44 on a screw in insert 46 to maintain the cooling coil circulation pipe 47 in a fixed position within the tank by receiver 45. Thus the coil is securely maintained between end cap 41 and opposite end cap 40 which typically will include a fixed inlet and outlet for the tank.

Figure 4:
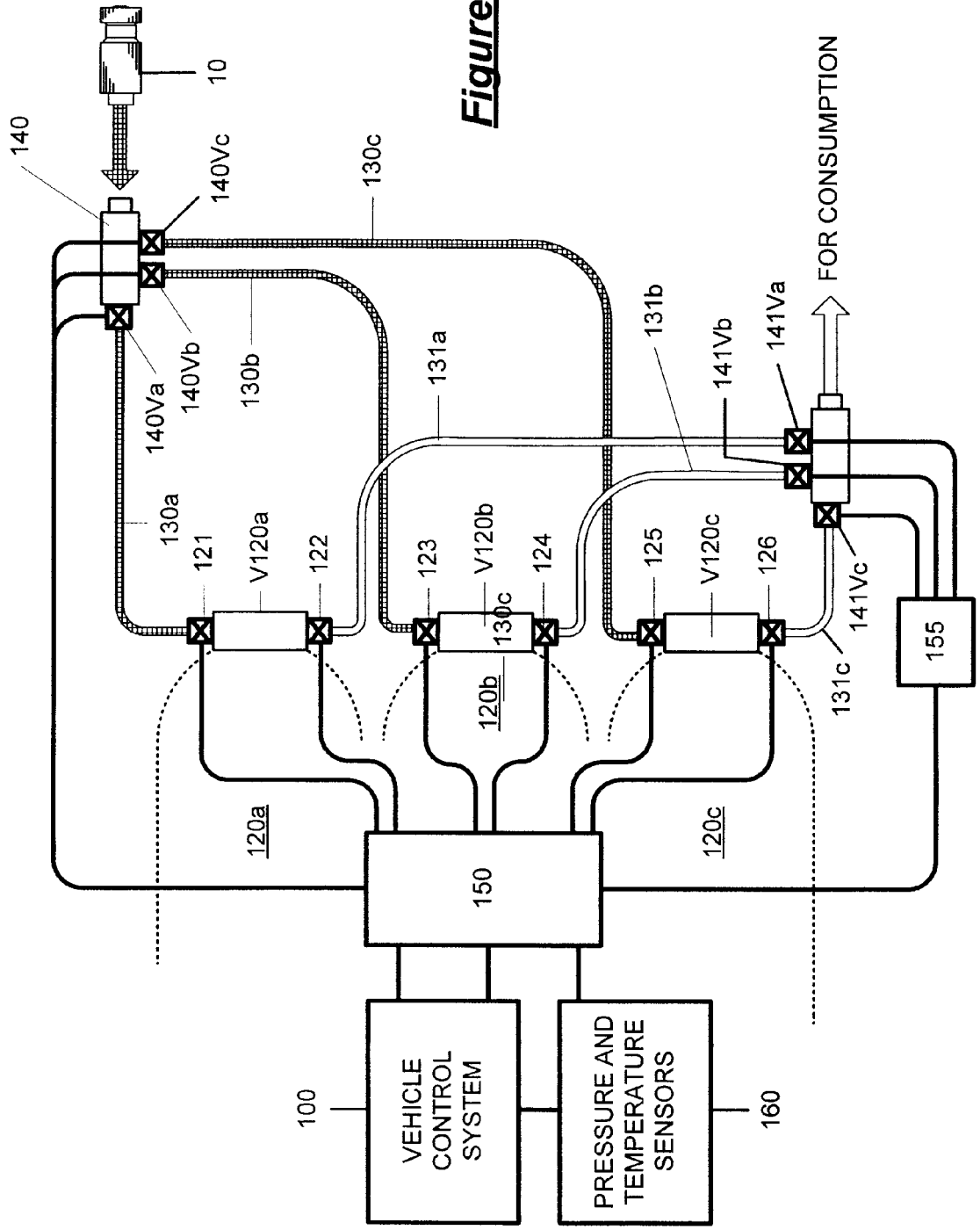
FIG. 4 shows a vehicle control system for multiple tanks, not a part of the invention per se, utilized in a vehicle refilling and fuel utilization system adaptable for use with the cooling system described herein.

The system is adaptable to multiple tanks and a vehicle control system, for example, as shown in FIG. 4. In FIG. 4, selectable or controllable inlet valves 121, 123 and 125 and selectable or controllable outlet valves 122, 124 and 126 on each tank 120$a$, 120$b$ and 120$c$ may be operatively interconnected with a control means, logic circuit, or CPU 150 and the vehicle control system 100 and a pressure and/or temperature or other sensing system associated with the tanks and/or their inlet and outlet lines, the radiator, and vehicle operation. As an alternative or supplemental control system, manifolds 140 and 141, respectively located between the tanks and the refill line and the hydrogen fuel cell stack or engine may have a plurality of controllable valves which may be separately operable. In the inlet manifold 140 leading from the refill line, the controllable valves include valves 140Va, 140Vb and 140Vc associated with each tank inlet. The outlet manifold includes controllable valves 141Va, 141Vb and 141Vc, each connected to the outlet of an associated tank. The manifold valves may be controlled by means 150 to allow hydrogen flow to or from a selected tank from the refill line or to the fuel cell or engine until a cut off or threshold pressure or temperature or other parameter, as appropriate in a particular instance of vehicle operation, in the selected tank or line, is sensed. As shown, outlet manifold 141 may include a plurality of selectable or controllable valves 141Va, 141Vb and 141Vc interconnected with the outlets 122, 124 and 126 of the vehicle tanks 120$a$, 120$b$ and 120$c$, controlled by a separate manifold valve switching means 155, interconnected with means 150. Specific control configurations and parameters, and valve locations and systems in accordance with the principles of the invention are preferably based on overall vehicle design considerations. For example, controllable tank valves may not be required to the extent that a manifold valve system, or check valve system, is sufficient, or tank and manifold valves may be both included. In another example, pressure, temperature and other sensors 160 may be provided to monitor tank and/or fuel/refill line pressures and temperatures or other parameters of vehicle operation. In the course of vehicle operation, the measure of the pressure and temperature or other parameter sensed may be input into an appropriate control means as a determinant associated with the operating protocol of the vehicle and its fuel system components such as a tank valve, the radiator circuit, and the manifold valve system. [Reference: Co-pending application Ser. No. 11/001,881, "Hydrogen Vehicle Gas Utilization and Refueling System" filed on Dec. 2, 2004 assigned to the same assignee as is the present application hereof.]

Figure 5:
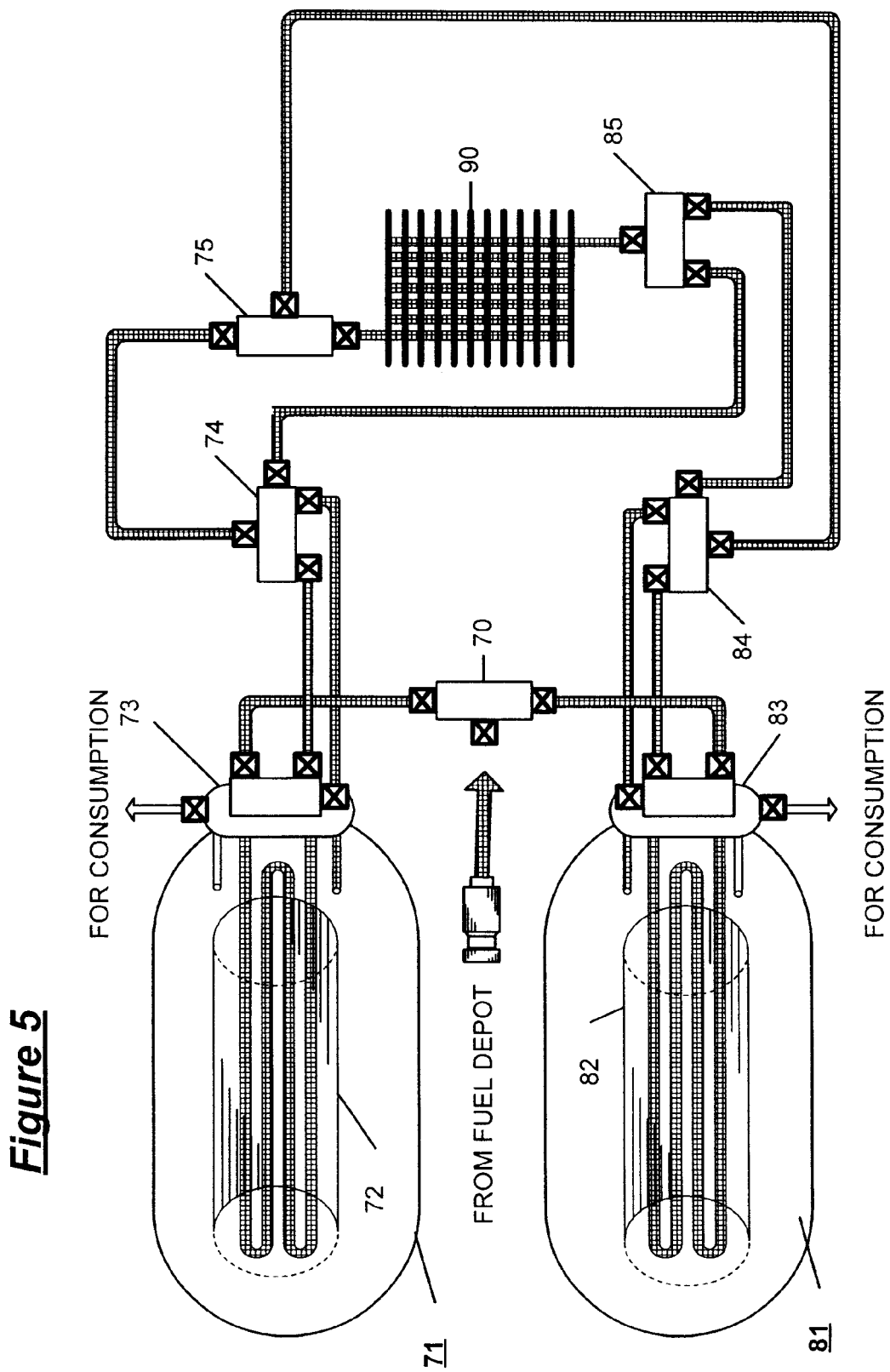
FIG. 5 shows two tanks connected to a common radiator configured in accordance with the invention herein showing a manifold system with switchable valves allowing tanks to be filled simultaneously or individually in series, using a common heat radiator.

FIG. 5 shows two tanks connected to a common radiator configured in accordance with the invention herein showing a manifold system with switchable valves allowing tanks to be filled simultaneously, or individually in series, using a common heat radiator. In FIG. 5, tanks 71 and 81 are disposed on the same vehicle; the tanks respectively include heat absorbing fin assembly and gas circulating tube circuits as discussed above shown at 72 and 82. A series of manifolds having switchable or programmable valves is associated with each tank: 73, 74 and 75 associated with tank 71; and 83, 84 and 85 associated with tank 81. The valves can be switched to allow simultaneous filling of the tanks using the same radiator 90 for both tanks, or may be alternatively programmed to allow tanks 71 and 81 to be filled individually in series. The programming of the valves and the number of tanks is a matter of design choice given the teachings herein and other desired vehicle operating parameters. Manifold 70 receives high pressure gas from the fuel depot and includes switchable valves consistent with the operating protocols stated above.

Figure 6:
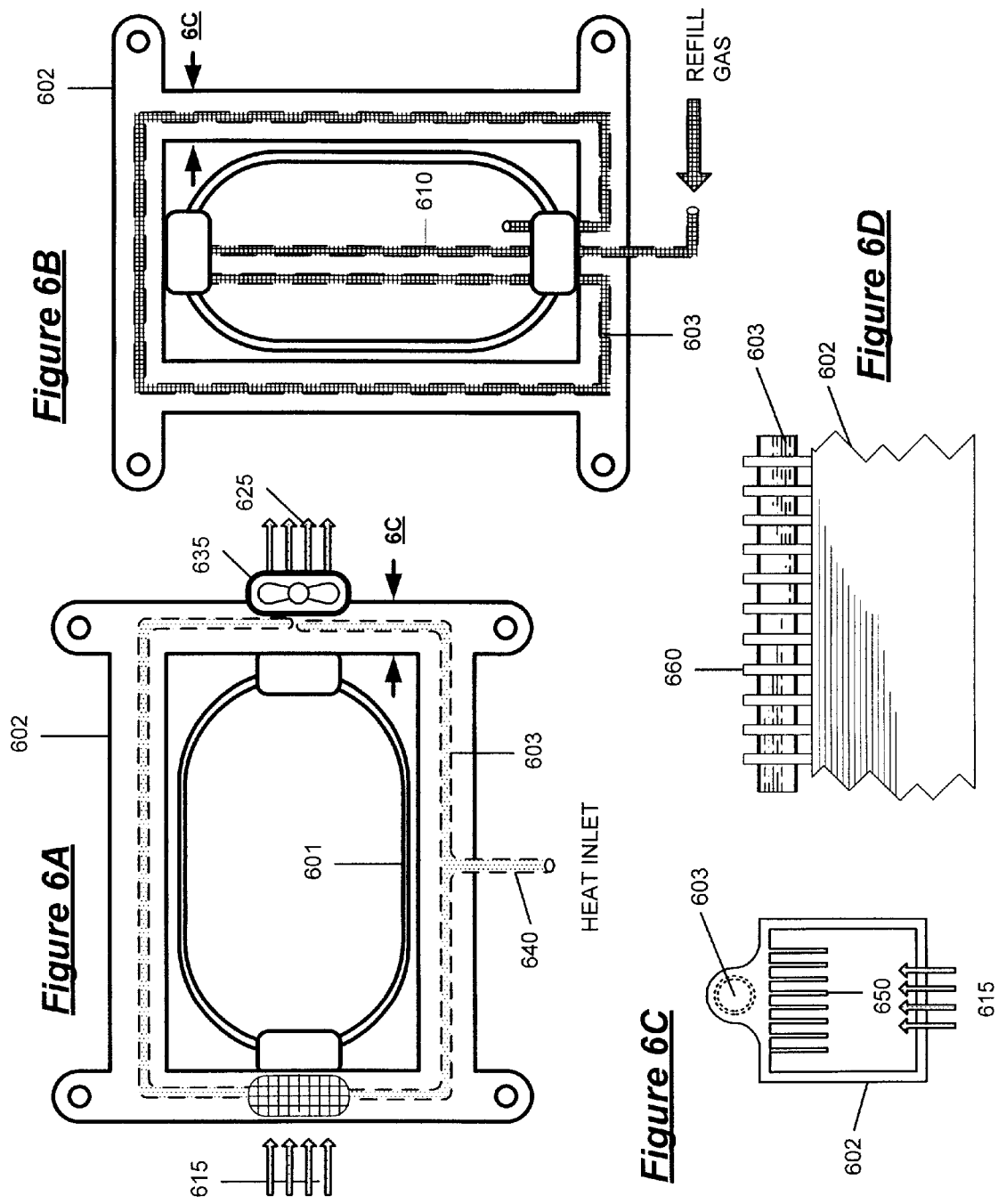
FIG. 6A shows a circulating fluid cooling line circuit disposed within a vehicle frame component for cooling heat introduced therein.
FIG. 6B shows a circulating refueling line cooling circuit disposed within a vehicle frame component for circulating the refueling gas, before the gas enters the tank, in accordance with an embodiment of the invention.
FIG. 6C and FIG. 6D show examples of cooling fin configurations disposed within and upon a vehicle frame assembly.

FIG. 6A shows a circulating fluid cooling line circuit 603 disposed within a vehicle frame component 602 surrounding tank 601 for circulating a cooling medium about the tank. In FIG. 6A, the media containing the heat to be dispersed is introduced at inlet 640. Cooling media, which may be air, is received in the frame component inlet 615 for the frame cooling system and exhausted through outlet 625, which may include a fan 635 or other active means for removing heat from the media introduced at inlet 640. In one example, coolant fluid such as air, water, Freon, etc., flows within a continuous circuit in tube 603 such that when heat is input at 640, inlet 615 will receive a supply of air and the opposite end 625 will evacuate the heat to the external environment.

FIG. 6B similarly shows a circulating cooling line circuit in which tube 603 is disposed within a vehicle frame component 602. Tube 603 is formed from a high strength heat absorbent material such as aluminum, copper, SUS, or other like heat materials; the frame subassembly surrounds high pressure tank; internal tank coil is shown at 610. The refueling gas is circulated through the cooling circuit 603 which may be mounted within or upon the frame; the gas is cooled before entry into the tank. FIG. 6C shows a cross section of the vehicle frame 602 at section 6C →← shown in FIG. 6A and FIG. 6B. FIG. 6C illustrates circulating tube 603 formed within the frame and includes internal frame fins 650. FIG. 6D shows an example of an external tube circuit upon the sub assembly wherein refuel gas circulation tube 603 is surrounded by external fins 660. The cooling circulating channel may be formed as an extruded or molded interior conduit or tube intrinsic with the frame, or attached thereto; however, it is preferable that the circulating tube within or upon the frame component be formed from a high conductivity high strength material such as an SUS or conductive stainless steel alloy having a strength sufficient to withstand the intermittent high pressures involved in a tank refill. With reference to the embodiment discussed as an example shown in FIG. 2, radiator 22 may be supplemented or replaced by the vehicle frame cooling system having configurations disposed on or within a vehicle frame assembly such as shown in FIG. 6A. In the examples shown in FIG. 3A and FIG. 5, may be supplemented or replaced by the vehicle frame cooling system having configurations disposed on or within a vehicle frame assembly such as shown in FIG. 6A. In the embodiments of FIG. 3A, radiator 33fr, and in FIG. 5, radiator 90; the heat radiating means shown in the embodiments as 33fr and 90, as appropriate, may be supplemented or replaced by the vehicle frame cooling system having configurations disposed on or within a vehicle frame assembly such as shown in FIG. 6B.

Figure 7:
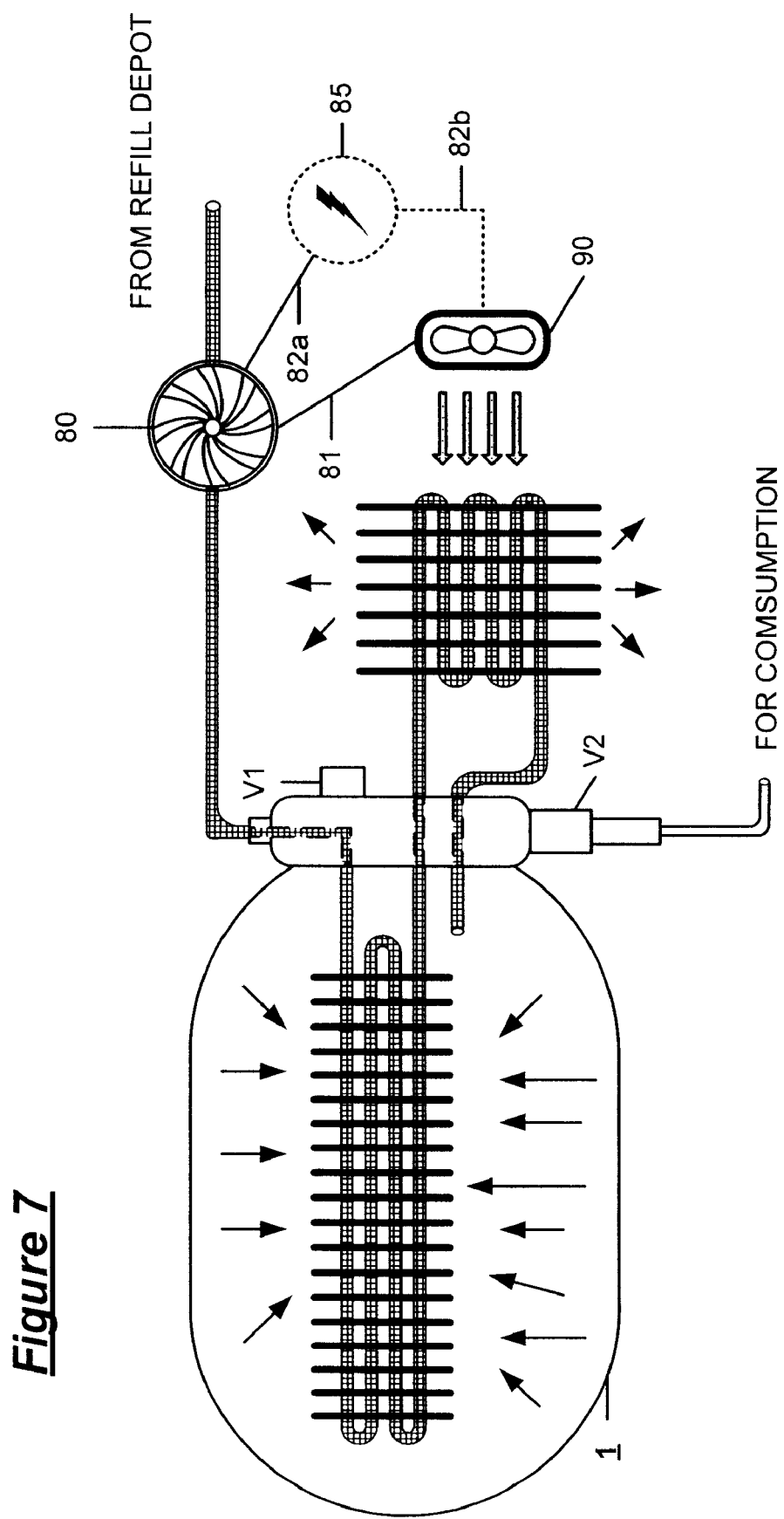
FIG. 7 shows an embodiment wherein the fluid flow of the high pressure gas is directed through an in line turbine to provide power to a coolant circulating pump.

In an example shown in FIG. 7, the mechanical energy of the high pressure refill is further utilized. The fluid flow of the high pressure gas is directed through an in line turbine 80 in the refill gas circuit to provide power to a coolant fan 90, either through a direct mechanical link 81 or through, for example, an alternate electric generator means 85 mechanically linked to 82a and powered by the turbine 80 whereby the generator 85 in turn provides electric power 82b to a fan 90 that is electrically powered. The use of an electric fan allows on demand control of the air through the radiator circuit.

Figure 8:
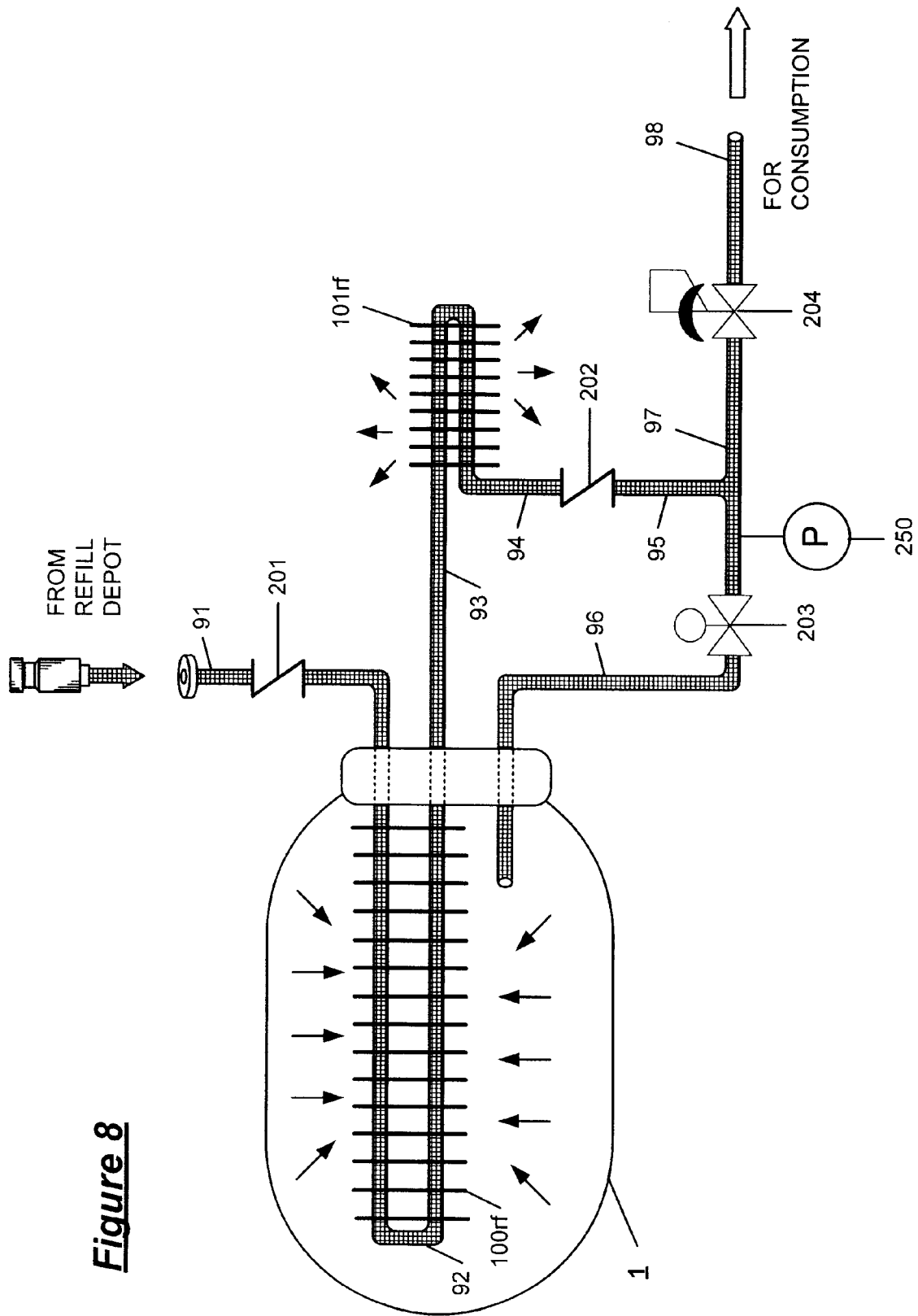
FIG. 8 shows a system for evacuating residual high pressure gas from the cooling coil circuit to avoid undue stress in the circuit pipes.

A system for evacuating high pressure gas from the cooling coil circuit to avoid undue stress in the gas circuit pipes is depicted in FIG. 8. After a refill, high pressure gas may remain in the refill/cooling circuit coil/tubes as a result of the overall extended length of the tubing system; residual high pressure may increase stress and promote the risk of leaks. In the example shown in FIG. 8, the risk is reduced and the gas is evacuated from the coil circuit through the configuration of valves 202, 203 and 204 shown in the after cooling fuel input segment of the system. During refueling, refill check valve 201 is open; solenoid valve 203 is open and refill gas flows in sections 91, 92, 93, 94, 95, 96 and 97 of the refill circuit. Radiator 101*rf* is shown in this example. After refueling, solenoid valve 203 is closed; check valve 201 is closed; check valve 202 is open and power plant control 204 is activated to allow consumption of the cooling circuit gas. Residual gas in the cooling circuit tube sections 92, 93, 94, 95 96 and 97 is thus utilized directed to the vehicle engine in conduit 98. In vehicle operation, after the residual gas in the tube circuit is consumed, check valve 202 closes (check valve 201 is already closed), solenoid valve 203 is opened and vehicle operation returns to normal with all inlet valves closed; fuel is allowed to flow from the tank with, sensor 250 monitoring pressure and pressure control valve 204 regulating input into the power plant through tube sections 96, 97 and 98.

Figure 9C:
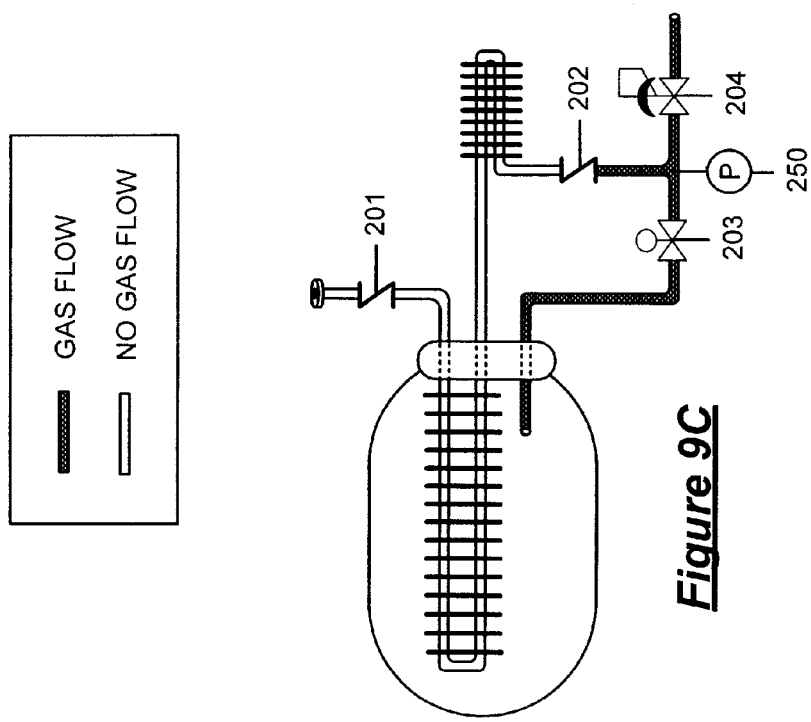
FIG. 9A, FIG. 9B and FIG. 9C respectively illustrate the system shown in FIG. 8 as 1) the vehicle is refilled; 2) the excess gas in the cooling tubes and coils are purged; and 3) and the vehicle resumes normal operation.
Figure 9A:
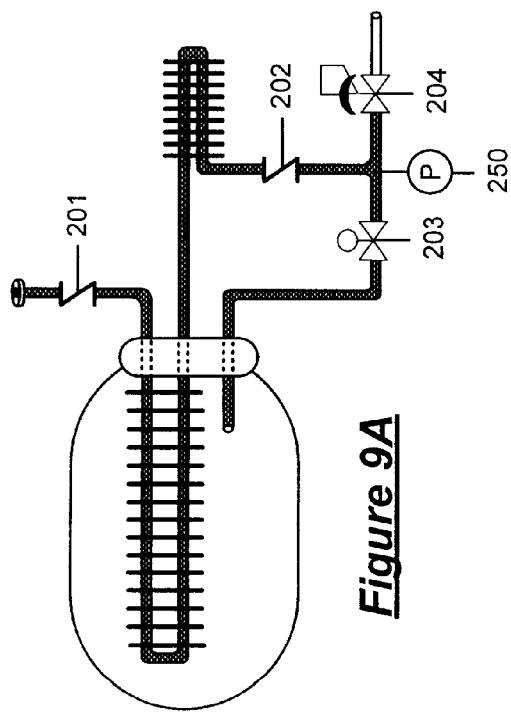
Figure 9B:
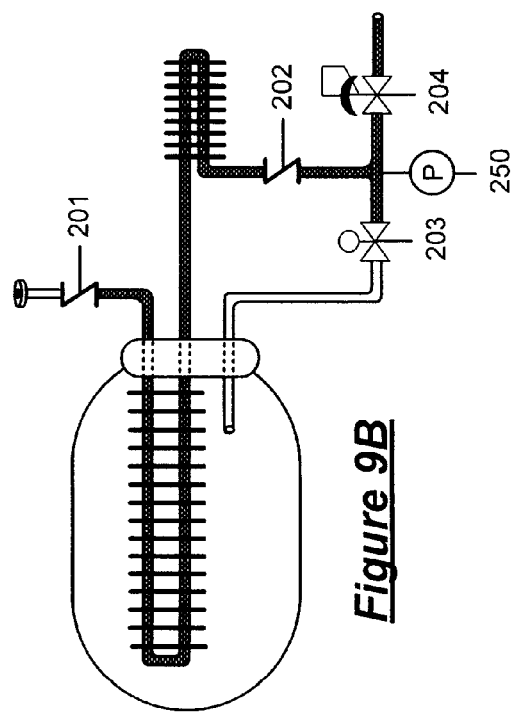

FIG. 9A, FIG. 9B and FIG. 9C illustrate the refill/purge sequence in the system shown in FIG. 8 from refill, FIG. 9A, through the purge of excess gas in the cooling tubes and coils, FIG. 9B, and to the resumption of normal vehicle operation, FIG. 9C. In refill status shown in FIG. 9A, check valve 201 is open, check valve 202 is open; solenoid valve 203 is open; and power plant pressure control valve 204 is closed, allowing refill gas to circulate in the cooling system and into the tank in accordance with the invention. In purge status shown in FIG. 9B, check valve 201 is closed when refill is completed; and solenoid valve 203 is closed; check valve 202 is open and power plant pressure control valve 204 is activated, allowing the residual refill gas remaining in the cooling coil circuit to be utilized by the vehicle as monitored by sensor 250 and controlled by power plant pressure control valve 204. When the residual gas is consumed, the system returns to a normal operation drawing fuel from the tank: 1) refill check valve 201 is closed; 2) check valve 202, disposed at the terminal end of the radiator circuit, is closed. when refill is completed; and 3) solenoid valve 203 is closed and power plant pressure control valve 204 is opened, In all instances described herein, it is assumed that during the state of refueling, the outlet valves for each tank are closed; and during the instance of consumption, the inlet valves for each tank are closed and the cooling fluid correspondingly circulated in a manner typically monitored and controlled by a vehicle operation system.

In addition to resolving the refill problem associated with the heat generated in a high pressure refill, the use of a radiator in the invention resolves the problem that when the vehicle is in operation, the internal gas temperature in the tank cools as gas is utilized and tank pressure drops. With an external heat exchanger or radiator appropriately monitored and controlled, heat from the ambient environment can be directed in reverse fashion from the radiator into the tank to heat up the gas inside of the tank and thereby increase the tank gas pressure resulting in further operation efficiency.

Having described the invention in detail, those skilled in the art will appreciate that, given the present description, modifications may be made to the invention without departing from the spirit of the inventive concept herein described. Therefore, it is not intended that the scope of the invention be limited to the specific and preferred embodiments illustrated and described. Rather, it is intended that the scope of the invention be determined by the appended claims.

The invention claimed is:

1. Apparatus in a vehicle having an on board tank for the storage of fuel gas under high pressure wherein 1) refuel gas is received within the on board tank; 2) the compression heat of refueling is absorbed by a heat exchanger within the interior of the on board tank; 3) the refuel gas circulates through the interior heat exchanger and absorbs the heat of compression; 4) the refuel gas having absorbed the heat, circulates to an exterior heat exchanger where the heat absorbed is radiated to an exterior environment through the heat exchanger exterior to the tank.

2. The apparatus of claim 1 wherein the gas flows within a conduit extending from a fuel depot to the internal heat exchanger to the external heat exchanger, and is therefrom returned to the inside of the tank through an inlet into the tank.

3. The apparatus of claim 2 comprising an inline turbine and a coolant fan in cooperative relationship with the external heat exchanger, wherein the gas flowing in the conduit is directed through the turbine and the turbine provides energy to power the fan.

4. In a vehicle having a bank of on board tanks connected in series for storage of gas under high pressure, an apparatus wherein refuel gas is received within a first on board tank and compression heat of refueling is absorbed by a heat exchanger within an interior of the first tank and heat thereby absorbed is radiated to an external environment through an external heat exchanger exterior to the tank, whereupon, after the first tank is filled with gas, an inlet to the first tank is closed, an inlet to a second tank is opened and the sequence of fuel gas receipt, heat absorption, heat radiation, and the return of fuel gas with respect to the second tank is repeated, and the inlet to the second tank is closed, and the circulation sequence of the gas is repeated for the remaining tanks in the bank, wherein each tank includes a continuous conduit extending in the tank interior from the tank gas inlet, through the internal heat exchanger, into the heat exchanger exterior to the tank, and therefrom back into the tank interior, whereupon, with regard to a first tank in the series, a conduit extends in the tank interior from the gas inlet of the first tank, through the internal heat exchanger of the first tank, into the heat exchanger exterior to the tank, and therefrom back to the interior of the first tank whereupon, after the first tank is filled with gas, the inlet to the first tank is closed, the inlet to the second tank is opened and a conduit extending in the interior of the second tank from the gas inlet of the second tank, directs gas flow through the internal heat exchanger of the second tank into the heat exchanger exterior to the tank, and therefrom back to the interior of the second tank, and the sequence of closing the inlet, opening the inlet to a next tank and directing gas flow in the conduit through the internal heat exchanger of the next tank, into the heat exchanger exterior to the next tank, and therefrom back to the interior of the next tank is repeated for the remaining tanks in the bank.

5. A vehicle having a bank of on board tanks connected in parallel for storage of gas under high pressure wherein each tank is connected in parallel to a gas inlet and an external heat exchanger and each tank includes a continuous conduit extending in an interior of the tank from the tank gas inlet, through a heat exchanger inside the tank, into the heat exchanger exterior to the tank, and therefrom back to the tank interior, wherein refuel gas is received within each on board tank and the compression heat of refueling is absorbed by the heat exchanger within each tank and heat thereby absorbed is radiated to an external environment through the heat exchanger exterior to the tank, whereupon, after all tanks are filled with gas, the gas inlet to the tanks is closed.

6. A vehicle having a bank of on board tanks connected in parallel for storage of gas under high pressure wherein each tank includes a continuous conduit extending in a tank interior from a tank inlet through an internal heat exchanger, into a heat exchanger exterior to the tank, and therefrom back to the tank interior, and wherein the conduit directs refuel gas to be received within each on board tank and flow through the heat exchanger within each tank to the heat exchanger exterior to the tank, and thereafter back to the tank interior.

7. Apparatus in a vehicle having an on board tank for the storage of fuel gas under high pressure wherein refuel gas flows within a conduit connectable to a fuel depot, the conduit comprising:
   an internal heat exchanger inside the tank;
   an external heat exchanger outside of the tank;
   a volume for the storage of gas inside of the tank; and
   an inlet for directing gas into the inside volume of the tank;
wherein:
   1) refuel gas introduced into the conduit from the fuel depot flows through the internal heat exchanger to the external heat exchanger and then into the inside of the tank via the inlet,
   2) as the gas in the tank is compressed, heat from the compressed gas is absorbed by the refuel gas flowing through the internal heat exchanger, and
   3) heat absorbed by the gas in the internal heat exchanger is transferred to and radiated to an exterior environment through the external heat exchanger.

8. Apparatus of claim 7 wherein the conduit comprises:
   a refill check valve disposed in advance of the internal heat exchanger;
   a second check value disposed after the external heat exchanger;
   an outlet from the inside of the tank connected to a gas flow system directing fuel gas to an engine in the vehicle; and
   a solenoid valve disposed between the outlet and the gas flow system directing fuel gas to the engine;
wherein
   1) during refueling, the refill check valve, the second check value and the solenoid valve are open to allow gas to flow through the internal and external heat exchangers and into the tank; and
   2) after refueling, the solenoid valve and refill check valve are closed and the second check valve is opened, such that residual gas in the heat exchangers is directed to the gas flow system directing fuel gas to the engine.

9. Apparatus of claim 8 wherein, after the residual gas in the heat exchangers is consumed, the second check valve is closed and the solenoid valve is opened.

10. Apparatus of claim 7 comprising a sensor and a pressure control valve, the sensor monitoring pressure and the pressure control valve regulating gas flow to an engine in the vehicle.

* * * * *